United States Patent
Chun et al.

(10) Patent No.: US 8,822,053 B2
(45) Date of Patent: Sep. 2, 2014

(54) ELECTRICAL ENERGY STORAGE DEVICE

(75) Inventors: Kyung-Sang Chun, Namdong-Gu (KR); Yuk-Seong Ryu, Yongin-Si (KR)

(73) Assignee: Nesscap Co. Ltd (KR)

( * ) Notice: Subject to any disclaimer, the term of this patent is extended or adjusted under 35 U.S.C. 154(b) by 175 days.

(21) Appl. No.: 13/254,453

(22) PCT Filed: Feb. 24, 2010

(86) PCT No.: PCT/KR2010/001154
§ 371 (c)(1),
(2), (4) Date: Sep. 1, 2011

(87) PCT Pub. No.: WO2010/101368
PCT Pub. Date: Sep. 10, 2010

(65) Prior Publication Data
US 2011/0318615 A1    Dec. 29, 2011

(30) Foreign Application Priority Data
Mar. 3, 2009  (KR) .................. 10-2009-0017962

(51) Int. Cl.
*H01M 2/38* (2006.01)
*H01M 2/02* (2006.01)

(52) U.S. Cl.
USPC ........................................... 429/82; 429/171

(58) Field of Classification Search
None
See application file for complete search history.

(56) References Cited

U.S. PATENT DOCUMENTS

| 4,271,241 A | 6/1981 | Hooke et al. |
| 2006/0216578 A1 | 9/2006 | Kwon et al. |
| 2007/0172722 A1 | 7/2007 | Nishide et al. |

FOREIGN PATENT DOCUMENTS

KR   20-1998-0011409 Y1   7/2001

*Primary Examiner* — Cynthia K. Walls
(74) *Attorney, Agent, or Firm* — Winstead PC

(57) ABSTRACT

Provided is an electrical energy storage device including an electrode winding body, which includes a positive electrode generating electrons by oxidation and reduction, a negative electrode for absorbing the generated electrons, and separation layers for physically separating the negative electrode from the positive electrode, which are sequentially wound around a winding core, and an electrolyte provided between the positive electrode and the negative electrode, the electrical energy storage device including: a terminal plate for connecting the electrode winding body to an external electrode interconnecting member such as an external resistor; a cylindrical can for accommodating the electrode winding body connected to the terminal plate; and a ring-shaped sealing member for closing an opening formed in the can; wherein the sealing member includes a vent part having a vent hole and integrally formed in the center of at least one side of the sealing member. According to the present invention, in which a porous membrane for closing the vent hole or the additional vent hole is expanded and burst in an accommodation hole of the can by an internal pressure of the can in the event that the internal pressure of the can is excessively increased by a long term use or an external factor, it is possible to prevent the can from being deformed or exploded.

9 Claims, 12 Drawing Sheets

ELECTRICAL ENERGY STORAGE DEVICE

TECHNICAL FIELD

The present invention relates to an electrical energy storage device, and more particularly, to a cylindrical electrical energy storage device which can reduce error rate and welding time when a terminal plate and polarity-leads of an electrode winding body are joined together.

BACKGROUND ART

In comparison with a primary battery having a discharge function only, a secondary battery such as a capacitor having both charge and discharge functions is fabricated by various methods for electrically connecting an internal current source to an external resistor. As a result, such connection methods significantly affect not only resistance and efficiency of the secondary battery, but also productivity of the secondary battery itself and use convenience thereof.

Therefore, there is a strong need for a terminal connection method capable of increasing electric capacity and reducing internal resistance, and an electrical energy storage device functioning as a secondary battery and fabricated by the terminal connection method.

FIG. 1 is a perspective view of a conventional cylindrical electrical energy storage device, FIG. 2 is a plan view of the cylindrical electrical energy storage device shown in FIG. 1, FIG. 3 is a cross-sectional view taken along the line I-I' of the cylindrical electrical energy storage device shown in FIG. 1, and FIG. 5 is a plan view of an electrode winding body included in the conventional cylindrical electrical energy storage device shown in FIG. 1.

Referring to FIGS. 1 to 3 and 5, the conventional cylindrical electrical energy storage device includes an electrode winding body 10 for generating charge transfer by oxidation and reduction reactions with electrolyte, a terminal plate 20 electrically connecting the electrode winding body 10 to an external resistor, and a can 30 for fixing the terminal plate 20 to the electrode winding body 10 and sealing the electrolyte and the electrode winding body 10 from the outside. Reference numerals 30a and 30b denote openings formed in the can. When the porous membrane for closing the vent hole is burst by an increase in the internal pressure of the can, the internal gas can be discharged to the outside through the openings 30a and 30b.

The electrode winding body 10 has a cylindrical shape in which a positive electrode 16 generating electrons by an oxidation reaction, a negative electrode 18 absorbing the generated electrons to cause a reduction reaction, and separation layers 14 physically separating the positive electrode 16 from the negative electrode 18 and isolating the places where the oxidation and reduction occur, which are sequentially wound around a winding core 12. A plurality of positive electrode leads A formed by a positive electrode collector and a plurality of negative electrode leads B formed by a negative electrode collector project separately from one end of the winding body 10 to form a substantially cylindrical shape.

The terminal plate 20 includes positive and negative electrode terminals 24 and 28, positive and negative electrode connection plates 22 and 26 connecting the positive and negative electrode leads A and B to the positive and negative electrode terminals 24 and 28, and a coupling member 21 to which the positive and negative electrode terminals 24 and 28 and the positive and negative electrode connection plates 22 and 26 are fixed. The positive electrode connection plate 22 is in contact with the positive electrode lead A by a positive electrode lead connection part 22a, and the negative electrode connection plate 26 is in contact with the negative electrode lead B by a negative electrode lead connection part 26a.

The positive and negative electrode connection plates 22 and 26 are integrally formed with the body, the lead connection parts 22a and 26a, and the terminals 24 and 28 to form a disc shape. The positive and negative electrode connection plates 22 and 26 may be integrally formed by die-casting or casting, or the lead connection parts 22a and 26a and the positive and negative electrode terminals 24 and 28 may be connected to the body by any one of welding, soldering, and brazing. A projection 21a is formed in the center of the terminal plate 20 to be inserted into the winding core 12 during manufacture of a battery, thereby positioning the connection plates 22 and 26.

The can 30 has a cylindrical structure with one open end and accommodates the electrode winding body 10. After accommodating the electrode winding body 10, the terminal plate 20 is fixed such that the leads A and B formed at an upper end of the electrode winding body 10 are in contact with the lead connection parts 22a and 26a and seals the can 30. Here, in order to increase the sealing effect, a sealing material 29 such as rubber may be used. The can 30 may be formed of a metal material such as aluminum, stainless steel, tin-plated steel, and the like, or formed of a resin material such as PE, PP, PPS, PEEK, PTEE, ESD, and the like. The material for the can 30 may be different depending on the kind of electrolyte.

After accommodating the electrode winding body 10 in the can 30 and sealing the can 30 using the terminal plate 20, the electrolyte is injected into the can 30 through an injection hole H to complete the conventional electrical energy storage device 90.

However, the above-described conventional electrical energy storage device 90 has the following problems.

First, it is not easy to connect the terminal plate 20 of the electrical energy storage device to the polarity-leads A and B of the electrode winding body.

In particular, the polarity-leads A and B may not be securely fixed to the terminal plate 20 when they are joined to the terminal plate 20 by welding or soldering.

Moreover, the welding or soldering may cause a contact failure between the polarity-leads A and B and an interconnecting member 40, which increases the entire internal electrical equivalent resistance.

During the welding process, the electrical energy storage device is joined by laser welding or ultrasonic welding. The laser welding uses a beam having high energy produced by stimulated radiation between energy levels of atoms or molecules.

Here, since the laser beam provides a concentrated heat source having a high energy density, it has little thermal influence on the materials and causes little thermal deformation, and thus it is used for precise welding, cutting, etc.

The laser welding has the advantage of easy operation because it can be done in the air and the laser beam can be easily directed to a place away from a laser generator. However, conventionally, only if the terminal plate has a thickness greater than a predetermined value, it is possible to cope with an increase in internal pressure. Therefore, when the lead connection parts of the electrode winding body having a very small thickness and the terminal plate having a large thickness are directly joined together by laser welding, there is a significant difference in thermal effects between the terminal plate and the lead connection parts, and thus the welding is not properly performed.

Meanwhile, the ultrasonic welding is a kind of pressure welding, in which the objects to be welded are stacked together and inserted between a welding chip and a pressure receiving portion and then ultrasonic vibration is applied from the welding chip to the objects while a low static pressure is applied thereto. In this method, the friction on the bonding surfaces caused by the vibration destroys any oxide film on the surfaces and causes local plastic deformation such that newly exposed metal surfaces are closely adhered to each other. Moreover, a local increase in temperature caused by the frictional heat accelerates diffusion and re-crystallization of atoms, which results in the formation of a strong pressure-welded portion. By means of this method, the polarity-leads and the terminal plate may be joined together. However, when the leads of the electrode winding body having a very small thickness are directly ultrasonic-welded to the terminal plate having a large thickness, there is a significant difference in thermal effects between the terminal plate and the leads, and thus the welding is not properly performed Due to this instability of welding, in the case that polarity-leads of an aluminum electrode winding body (collector) having a thickness of 10 to 40 μm are directly welded to a terminal plate having a thickness of 0.5 to 1.0 mm, for example, a high laser energy sufficient to basically melt the thick terminal plate is used, and thus the polarity-leads are significantly affected by a minute change in the shape of the objects to be welded and by a change in contact state. As a result, the welding may not be properly performed or the objects may be excessively melted. The improper welding increases the internal resistance of a capacitor, and when the objects are excessively melted, the insulating paper may be burned to cause an insulation failure between the two electrodes.

Moreover, there is no plan to effectively cope with the problems such as explosion caused by an increase in the internal pressure of the can after long time use.

DISCLOSURE

Technical Problem

The present invention has been made in an effort to solve the above-described problems associated with prior art, and an object of the present invention is to provide an electrical energy storage device, in which a porous membrane for closing a vent hole or an additional vent hole is expanded and burst in an accommodation hole of a can by an internal pressure of the can in the event that the internal pressure of the can is excessively increased by a long term use or an external factor, thereby preventing the can from being deformed or exploded. Moreover, the present invention provides an electrical energy storage device, in which in the event that the internal pressure of an electrode winding body is increased to a predetermined level, the internal gas is discharged from the electrode winding body to the outside such that the internal pressure is maintained at an appropriate pressure and the specific surface area between carbon layers is increased, thereby increasing the durability.

Technical Solution

To achieve the above-described objects, the present invention provides an electrical energy storage device comprising an electrode winding body, which includes a positive electrode generating electrons by oxidation and reduction, a negative electrode for absorbing the generated electrons, and separation layers for physically separating the negative electrode from the positive electrode, which are sequentially wound around a winding core, and an electrolyte provided between the positive electrode and the negative electrode, the electrical energy storage device comprising: a terminal plate for connecting the electrode winding body to an external electrode interconnecting member such as an external resistor; a cylindrical can for accommodating the electrode winding body connected to the terminal plate; and a ring-shaped sealing member for closing an opening formed in the can, wherein the sealing member includes a vent part having a vent hole and integrally formed in the center of at least one side of the sealing member.

Advantageous Effects

According to the electrical energy storage device of the present invention, in which a porous membrane for closing a vent hole or an additional vent hole is expanded and burst in an accommodation hole of a can by an internal pressure of the can in the event that the internal pressure of the can is excessively increased by a long term use or an external factor, it is possible to prevent the can from being deformed or exploded.

MODE FOR INVENTION

Figure 1:
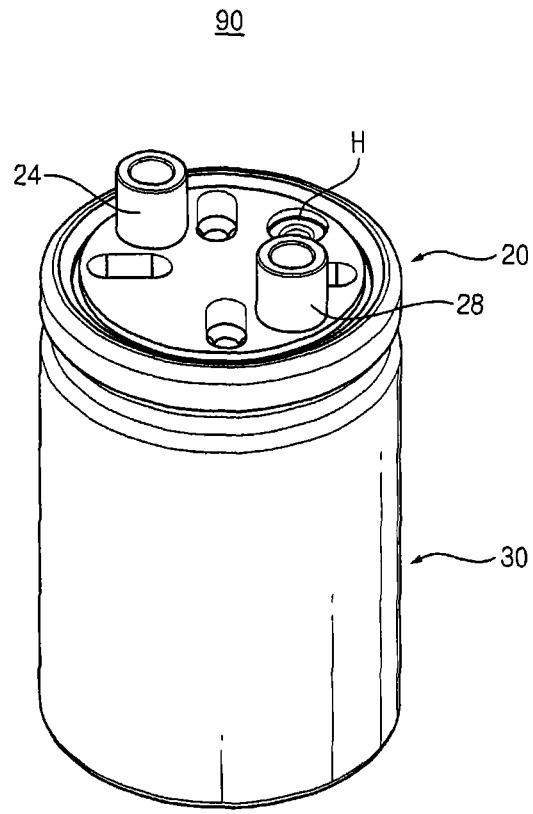
FIG. 1 is a perspective view of a conventional cylindrical electrical energy storage device having unidirectional terminals.
Figure 2:
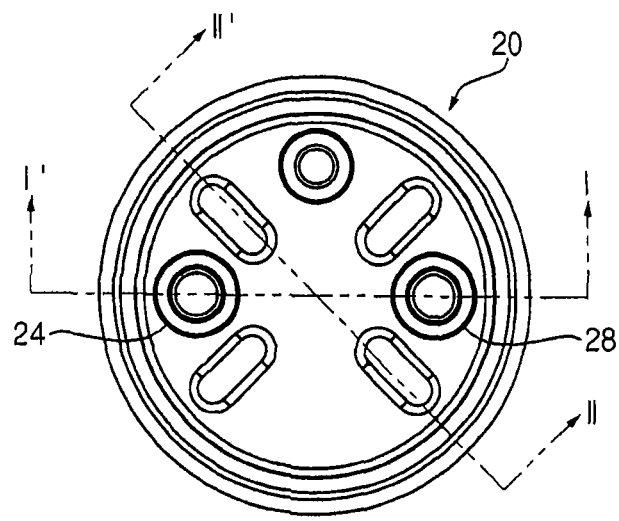
FIG. 2 is a plan view of the cylindrical electrical energy storage device shown in FIG. 1.
Figure 3:
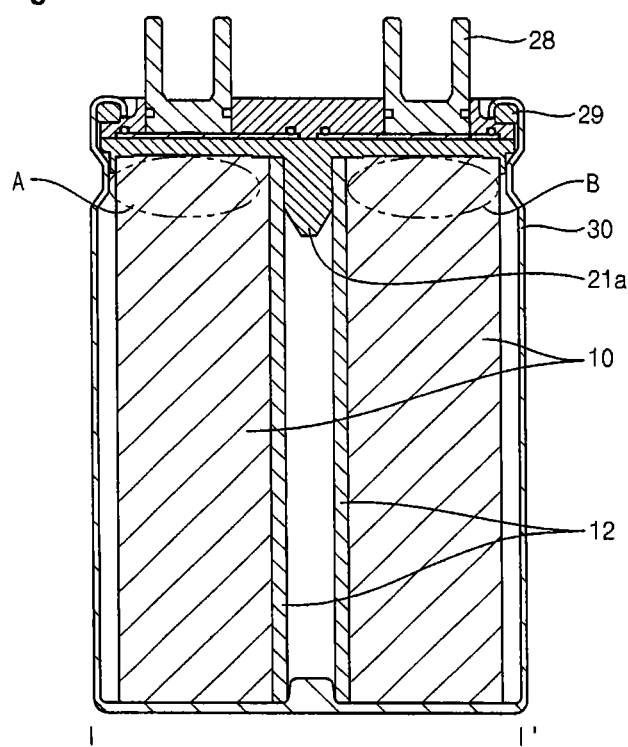
FIG. 3 is a cross-sectional view taken along the line I-I' of the cylindrical electrical energy storage device shown in FIG. 2.
Figure 4:
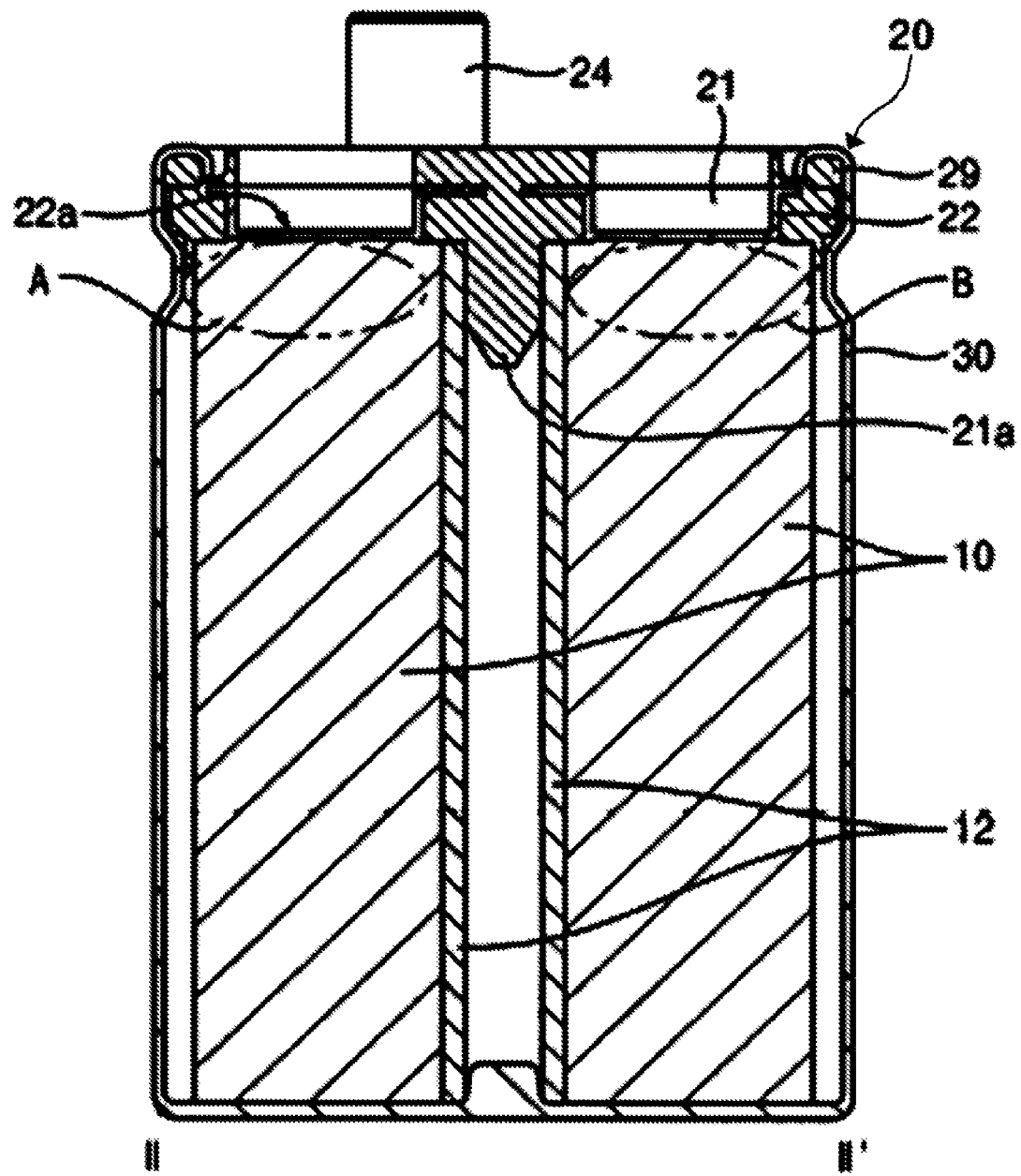
FIG. 4 is a cross-sectional view taken along the line II-IF of the cylindrical electrical energy storage device shown in FIG. 2.
Figure 5:
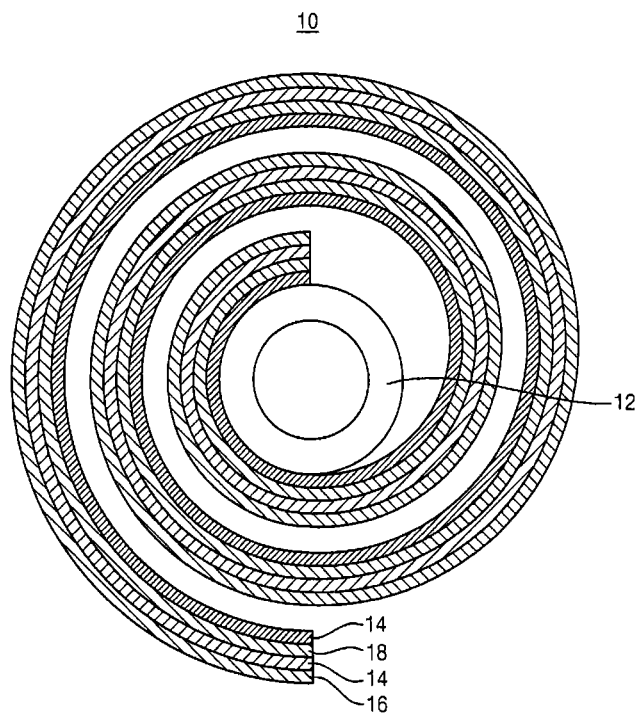
FIG. 5 is a plan view of an electrode winding body included in the conventional cylindrical energy storage device shown in FIG. 1.
Figure 6:
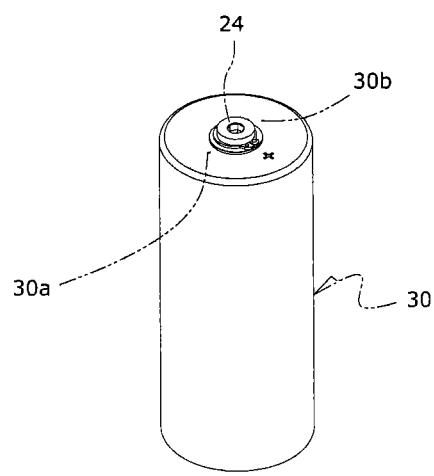
FIG. 6 is a perspective view of an electrical energy storage device having bidirectional terminals in accordance with an exemplary embodiment of the present invention.
Figure 7:
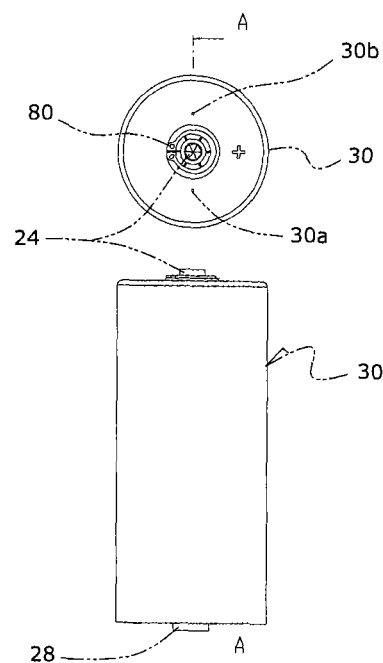
FIG. 7 is a plan view and a side view of the electrical energy storage device shown in FIG. 6.
Figure 8:
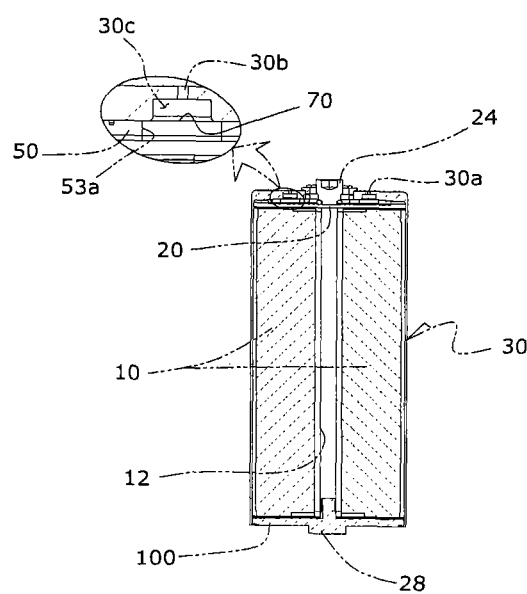
FIG. 8 is a longitudinal cross-sectional view taken along the line A-A of the electrical energy storage device shown in FIG. 7.
Figure 9:
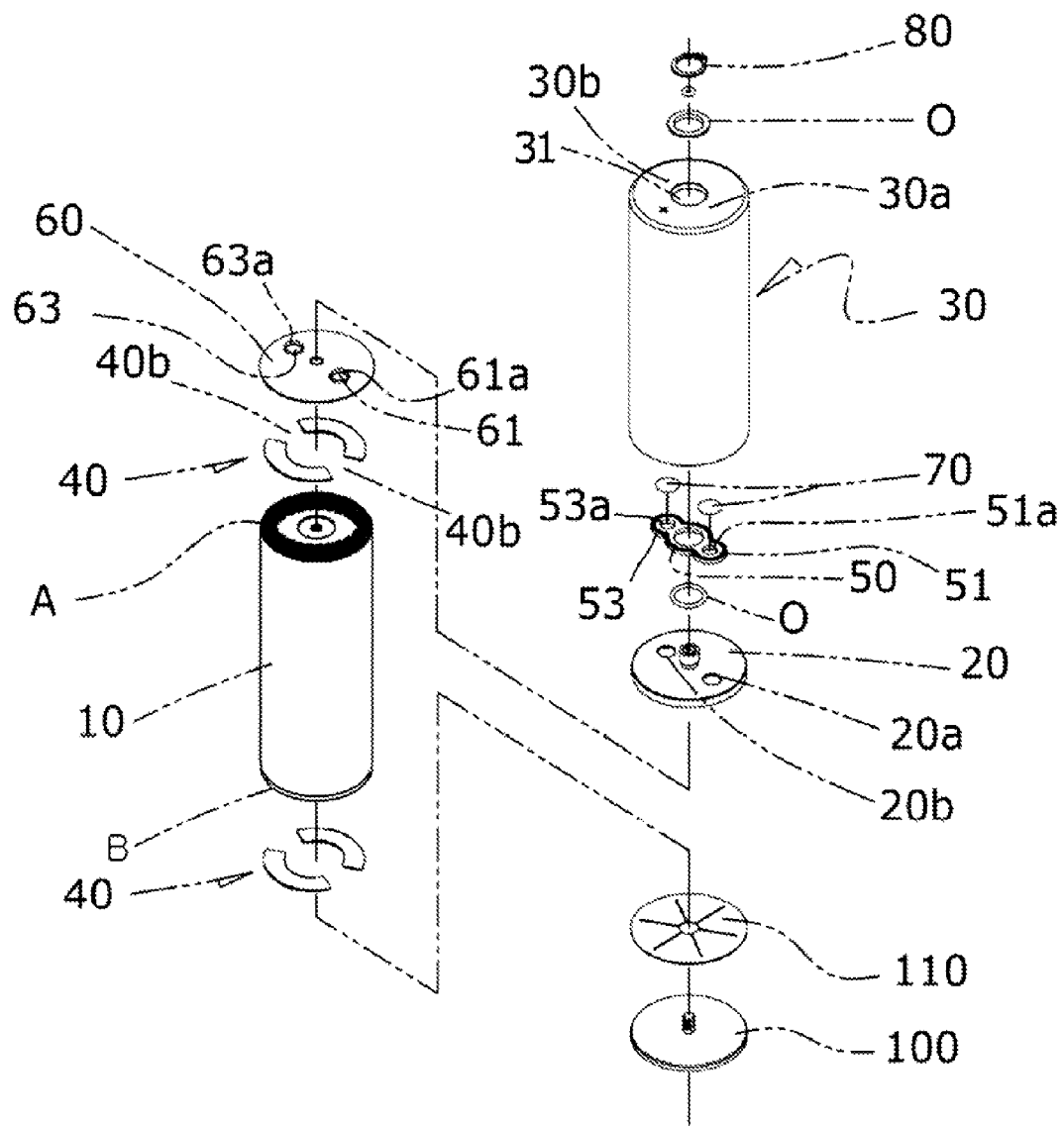
FIG. 9 is an exploded perspective view of the internal components of the electrical energy storage device shown in FIG. 6.
Figure 10:
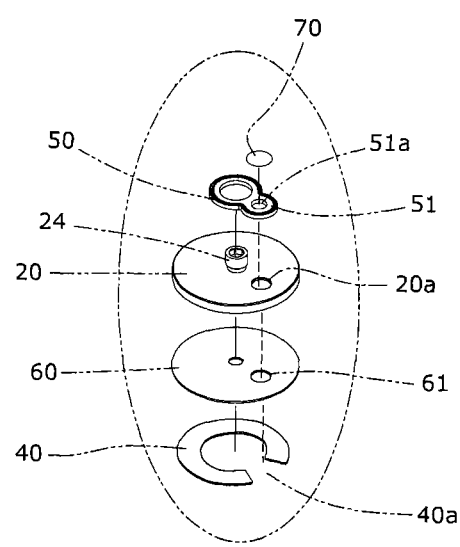
FIG. 10 is an exploded perspective view showing an interconnecting member and a sealing member of the electrical energy storage device shown in FIG. 9 in accordance with an exemplary embodiment of the present invention.
Figure 11:
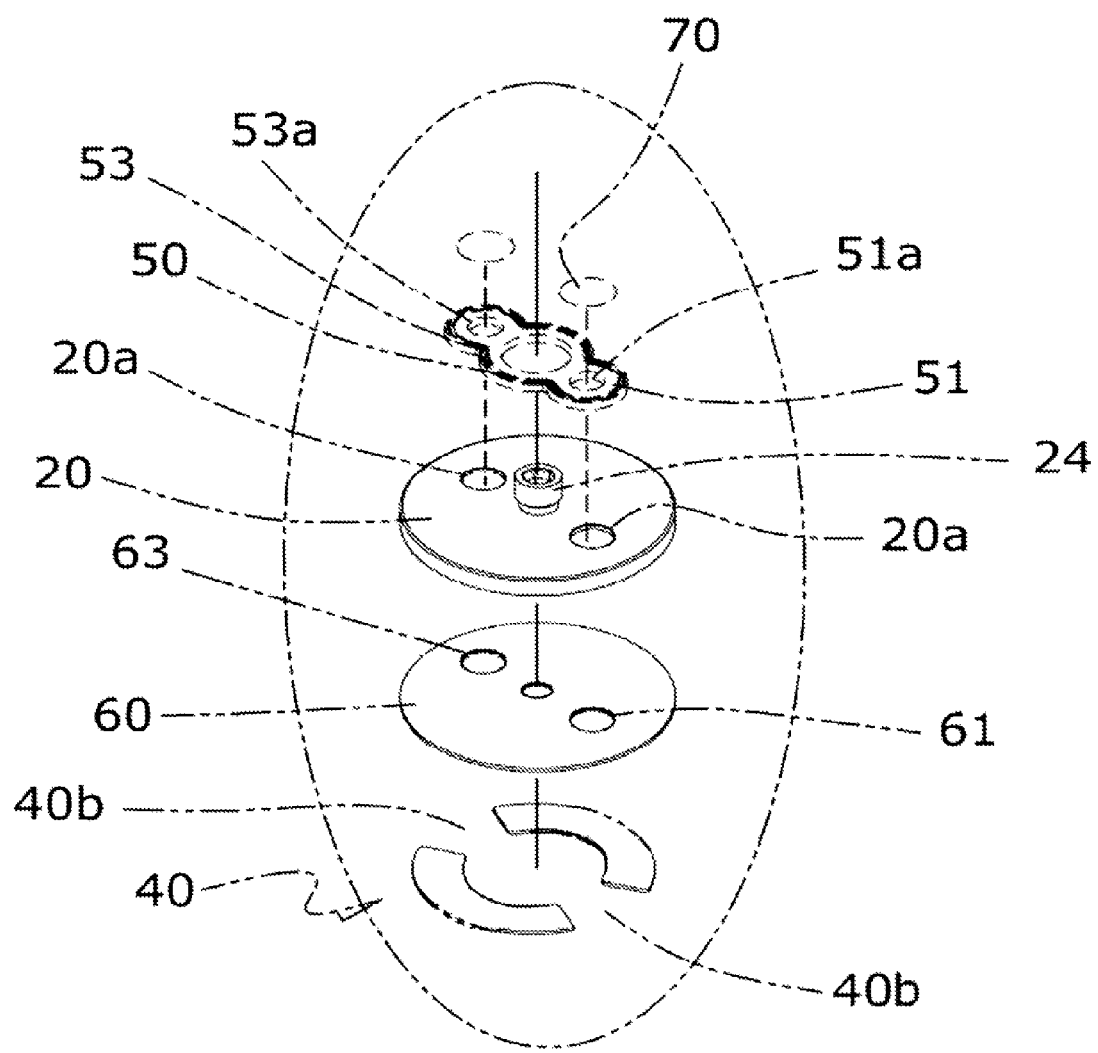
FIG. 11 is an exploded perspective view showing an interconnecting member and a sealing member of the electrical energy storage device shown in FIG. 9 in accordance with another exemplary embodiment of the present invention.
Figure 12:
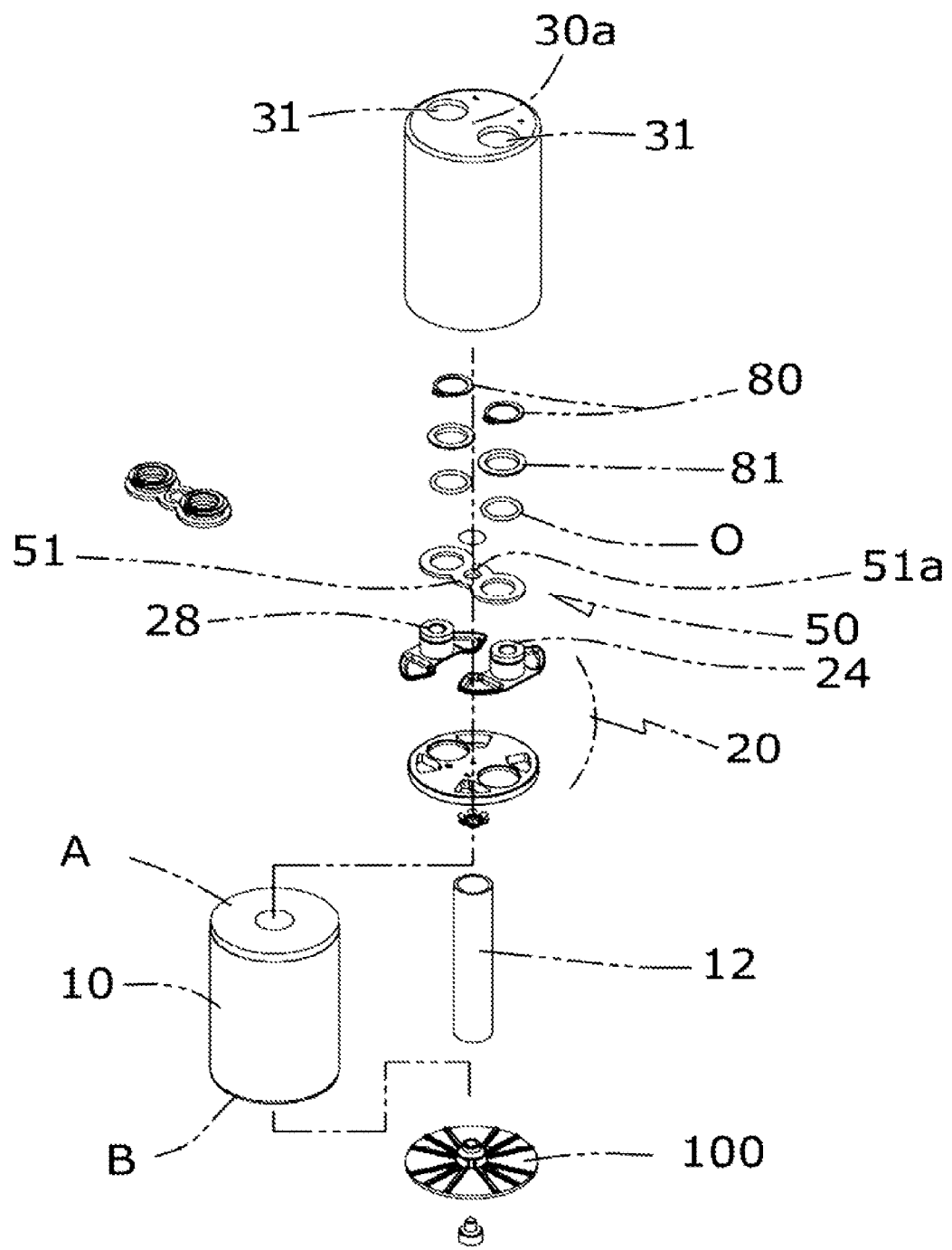
FIG. 12 is an exploded perspective view of an electrical energy storage device having unidirectional terminals in which the interconnecting member and the sealing member of the present invention are employed.
Figure 13:
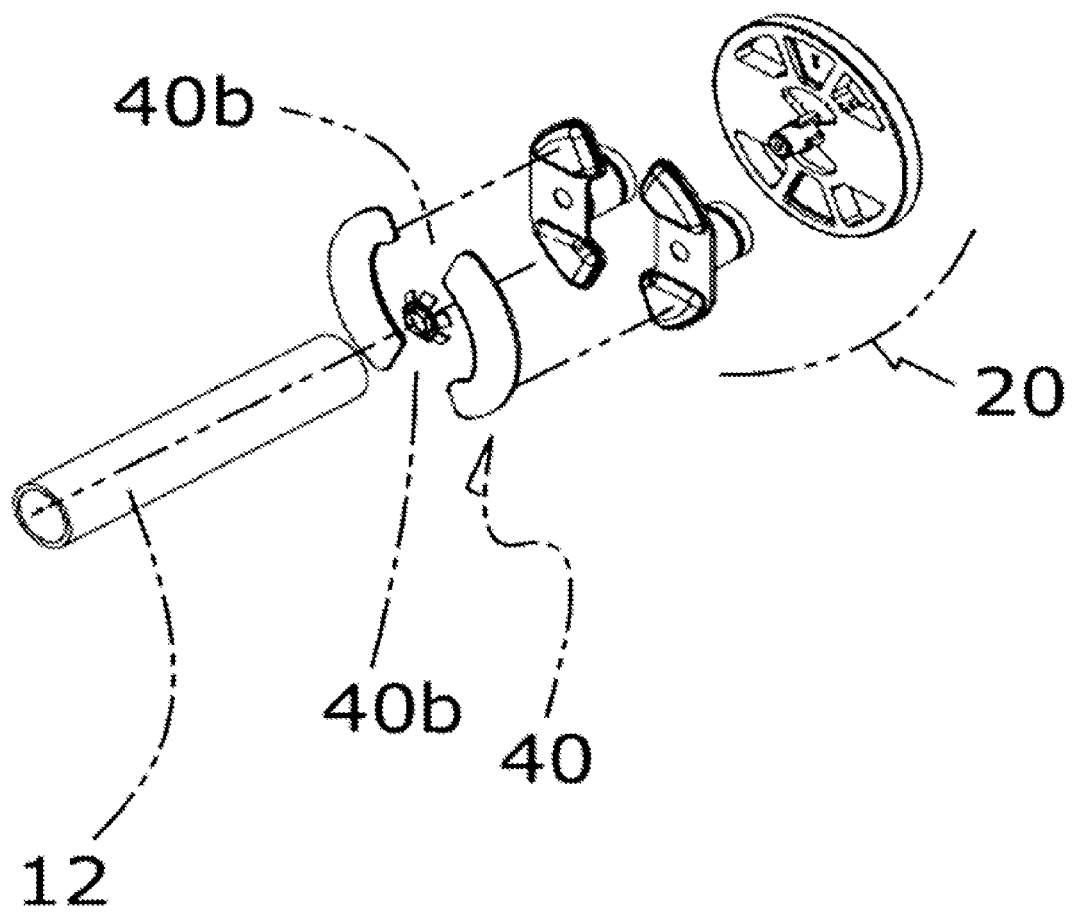
FIG. 13 is an enlarged exploded perspective view of the interconnecting member of FIG. 12 being connected to unidirectional terminals.
Figure 14:
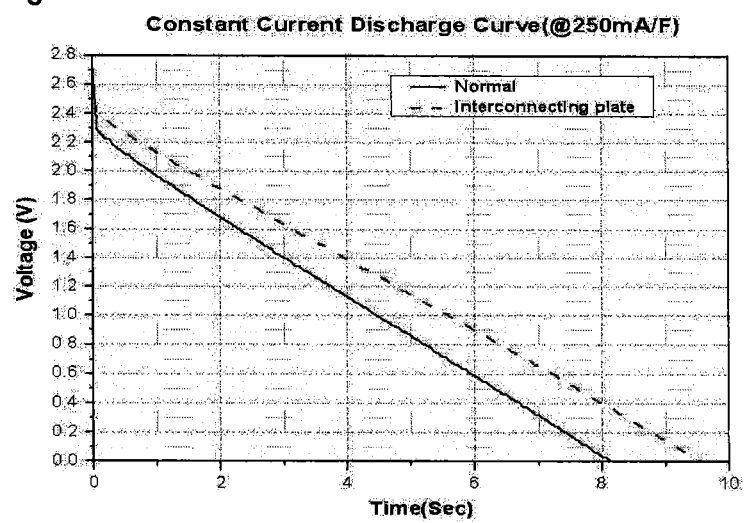
FIG. 14 is a graph showing a large current discharge curve with respect to time, in which the internal equivalent resistance decreases.
Figure 15:
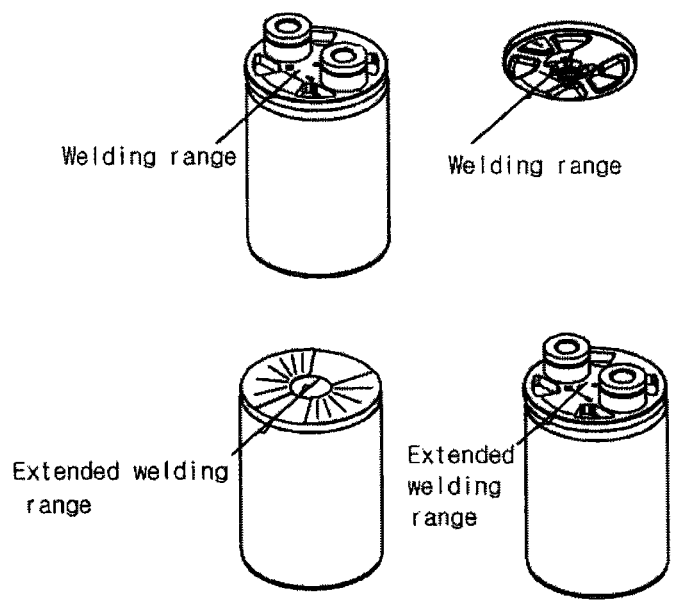
FIG. 15 is view showing a connection state in which the welding range is substantially increased.

Hereinafter, the construction of the present invention will be described with reference to the attached drawings. FIG. 6 is a perspective view of an electrical energy storage device having bidirectional terminals in accordance with an exemplary embodiment of the present invention, FIG. 7 is a plan view and a side view of the electrical energy storage device shown in FIG. 6, FIG. 8 is a longitudinal cross-sectional view taken along the line A-A of the electrical energy storage device shown in FIG. 7, FIG. 9 is an exploded perspective view of the internal components of the electrical energy storage device shown in FIG. 6, FIG. 10 is an exploded perspective view showing an interconnecting member and a sealing member of the electrical energy storage device shown in FIG. 9 in accordance with an exemplary embodiment of the present invention, FIG. 11 is an exploded perspective view showing an interconnecting member and a sealing member of the electrical energy storage device shown in FIG. 9 in accordance with another exemplary embodiment of the present invention, FIG. 12 is an exploded perspective view of an electrical energy storage device having unidirectional terminals in which the interconnecting member and the sealing member of the present invention are employed, FIG. 13 is an enlarged exploded perspective view of the interconnecting member of FIG. 12 being connected to unidirectional terminals, FIG. 14 is a graph showing a large current discharge curve with respect to time, in which the internal equivalent resistance decreases, and FIG. 15 is view showing a connection state in which the welding range is substantially increased.

An electrical energy storage device according to an exemplary embodiment of the present invention shown in the drawings will now be described.

The resistance and efficiency of a secondary battery as an electrical energy storage device are significantly affected by a method of electrically connecting an internal current source to an external resistor. Therefore, the present invention provides an electrical energy storage device which functions as a secondary battery and is fabricated by a terminal connection method capable of increasing electric capacity and reducing internal resistance. The electrical energy storage device comprises an electrode winding body 10, which includes a positive electrode generating electrons by an oxidation reaction, a negative electrode absorbing the generated electrons, and separation layers for physically separating the negative electrode from the positive electrode, which are sequentially wound around a winding core, and an electrolyte provided between the positive electrode and the negative electrode.

Moreover, the electrical energy storage device according to the present invention comprises a terminal plate 20 for connecting the electrode winding body 10 to an external electrode connecting member such as an external resistor, a cylindrical can 30 for accommodating the electrode winding body 10 connected to the terminal plate 20, and a ring-shaped sealing member 50 for closing an opening 31 (first opening 31) formed in the can 30.

Moreover, a vent part 51 (first vent part 51) having a vent hole 51a (first vent hole 51a) is integrally formed in the center of at least one side of the sealing member 50.

An additional vent part 53 (second vent part 53) having an additional vent hole 53a (second vent hole 53a) is integrally formed in the center of the other side of the sealing member 50.

An interconnecting member 40 has a U-shaped curved strip of which one side is opened by an escape hole 40a (third opening 40a) for escaping the vent part 51.

Moreover, the interconnecting member 40 may have a plurality of arc-shaped curved strips such that both sides thereof are opened by an additional escape hole 40b (second opening 40b) for escaping the vent part 51 and the additional vent part 53.

The sides of the interconnecting member 40 are roughly processed by etching or polishing using sandpaper or a grinder to increase the welding rate.

Moreover, a fluorine resin film as a porous membrane 70 having continuous pores is interposed between the top of the vent part 51 and the additional vent port 53 and the bottom of an accommodation hole 30c of the can 30 to close the vent hole 51a and the additional vent hole 53a.

Furthermore, a circular aluminum thin film as the porous membrane 70 is interposed between the top of the vent part 51 and the additional vent port 53 and the bottom of the accommodation hole 30c of the can 30.

In addition, a polymer (PTFE) thin film as the porous membrane 70 having continuous pores is interposed between the top of the vent part 51 and the additional vent port 53 and the bottom of the accommodation hole 30c of the can 30 to close the vent hole 51a and the additional vent hole 53a.

The porous membrane 70 is adhered to the top of the vent port 51 or the additional vent part 53 using an adhesive.

The porous membrane 70 of the present invention comprises a membrane, through which gas permeates, in addition to a composite of a binder and PTFE particles, formed without a gap.

In detail, the porous membrane 70 contains water-repellent particles having an average particle diameter of 0.01 to 50 μm to form a gap through which gas can permeate. Since a part or the entire gas permeable membrane of the present invention contains water-repellent particles, the inner walls of micropores on the surface of the membrane or in the membrane have a plurality of concave-convex portions. Therefore, it is possible to increase the water repellency of the membrane by the concave-convex portions and to achieve super water repellency in which the contact angle with water is about 120°.

Therefore, when the air passes through the gas permeable membrane of the present invention, it is possible to prevent permeation of water vapor.

The gas permeable membrane of the present invention has an average particle diameter of 0.01 to 50 μm and fabricated by bonding water-repellent particles in various ways. For example, an agglomeration of water-repellent particles melted by heat may be used as the gas permeable membrane. The properties of the membrane can be controlled by modifying the kind of particles that constitute the membrane, the particle diameter, and the bonding method of particles.

A fluorine resin may be used as the water-repellent particles. The fluorine resin may be at least one selected from the group consisting of polytetrafluoroethylene, polyvinyl fluoride, and polyvinylidene fluoride.

For example, the gas permeable membrane of the present invention may have a specific surface area of 0.1 to 500 m$^2$/g. Moreover, the gas permeable membrane may have a thickness of, but not limited to, about 0.1 to 1,000 μm.

Moreover, the present invention relates to a gas permeable sheet comprising the gas permeable membrane and a porous substrate for supporting the membrane, or a gas permeable sheet having a three layered structure comprising the gas permeable membrane and a pair of porous substrates for supporting the same. The gas permeable sheet of the present invention may have a Gurley number of 0.5 to 50,000 seconds.

The porous membrane 70 may be formed of at least one selected from the group consisting of polyethylene, polypropylene, polytetrafluoroethylene, vinylon, polyphenylene sulfide (PPS), polybutylene terephthalate (PBT), and nylon.

The porous substrate may have a mesh, non-woven, or microporous membrane structure. Moreover, the porous substrate may be formed of metal such as aluminum. That is, a perforated or non-perforated metal sheet or metal mesh may be used.

The agglomeration of water-repellent particles may comprise micropores having a diameter of less than 0.5 μm. For example, the ratio of the total pore volume S1 in the diameter range of 0.01 to 0.5 μm to the total pore volume S2 in the diameter range of 0.01 to 10 μm may be 0.01 to 0.8, more preferably 0.02 to 0.75.

Moreover, the gas permeable membrane of the present invention comprising micropores with a diameter of less than 0.5 μm may have a microporosity of 20 to 90%.

The electrical energy storage device comprises the terminal plate 20 for connecting the electrode winding body 10 to an external electrode interconnecting member such as an external resistor, the cylindrical can 30 for accommodating the electrode winding body 10 connected to the terminal plate 20, and a conductive interconnecting member 40 for connection between the terminal plate 20 and polarity-leads on one side of the electrode winding body 10 by a method selected from the group consisting of plasma-spraying, welding, soldering and adhesion using a conductive adhesive material.

An additional interconnecting member 60 having a size capable of being connected into the can 30 is interposed between the interconnecting member 40 and the terminal plate 20. Therefore, the thickness of the polarity-leads A and B, that of the additional interconnecting member 60, that of the interconnecting member 40, and that of the terminal plate 20 are gradually increased to increase the welding rate between the polarity-leads A and B projecting from one side of the electrode winding body 10, the interconnecting member 40, and the terminal plate 20.

Moreover, an additional terminal plate 100, i.e., a negative electrode terminal plate is inserted and welded to the bottom of the can 30.

Furthermore, an additional conductive interconnecting member 60 is interposed between a plurality of additional toothed polarity-leads A and B having the same shape as the existing leads projecting from the other side of the electrode winding body 10 and the additional terminal plate 20 and connected by a method selected from the group consisting of plasma-spraying, welding, soldering, and adhesion using a conductive adhesive material.

A plurality of recesses 61 and 63 having boss portions 61a and 63b are radially provided on the side of the additional interconnecting member 60 to be inserted and connected to vent holes 20a and 20b of the terminal plate 20, thereby facilitating the interconnection between the interconnecting member 40 and the terminal plate.

The porous membrane 70 may be an aluminum or polymer (PTFE) thin film having an adhesive layer to be adhered to the upper surfaces of the vent hole 51a and the additional vent hole 53a, which functions to close a plurality of pores 31 and 33 radially penetrating in an upper closed portion of the can 30.

In the event that the internal pressure of the can is excessively increased by a long term use or an external factor, the porous membrane 70 for closing the vent hole 51a or the additional vent hole 53a is expanded and burst in the accommodation hole 30c of the can 30 by the internal pressure of the can 30, and thus the porous membrane 70 serves as an anti-explosion valve for preventing the can 30 from being deformed or exploded.

Meanwhile, reference numeral 80 indicates a snap ring serving as holding means for holding the terminal A so as to be firmly coupled to the opening 31 of the can 30, reference numeral O indicates an insulator as an insulating material, and reference numeral 100 indicates a negative terminal plate which is bonded to the negative polarity-lead B of the electrode winding body 10 with the additional interconnecting member 60 interposed therebetween.

As illustrated in the drawings, the present invention can achieve its desired objective by connecting the interconnecting member 40 to the terminal plate 20 in a hardware manner. The concept of large current discharge efficiency in which the internal equivalent resistance is reduced is shown in FIG. 14.

This shows that, while the regions adjacent to the center of the electrode winding body 10 should be partially welded due to the shape of the structure in the conventional art, the polarity-leads A and B of the electrode winding body 10 as a current collector can be uniformly surface-welded by applying the interconnecting member 40 according to the present invention, and as a result, the parallel circuits of the electrode winding body 10 are increased in number and formed at substantially equal intervals and the average charge transfer distance (resistance length) is decreased, which significantly reduces the resistance of the electrode winding body 10, thereby enhancing the high-rate discharge (large current discharge) efficiency.

In other words, the internal equivalent resistance is reduced, which improves the discharge characteristics during high-rate discharge, and thereby the discharge efficiency during large current discharge is improved.

Test results obtained from the conventional samples and the interconnecting members 40, in which the discharge is performed after the initiation of high-rate discharge, are as shown in the following [Table 1].

TABLE 1

| Sample | Ver. | Reference Discharge Current | Discharge Current (A) | Energy (Wh) | % | Capacity (Ah) | % | Capacitance (F) | % | $ESR_{AC}$ | $ESR_{DC}$ | $ESR_{DC}$ rate (%) |
|---|---|---|---|---|---|---|---|---|---|---|---|---|
| 2.7 V/3600 F | 2.0 | 10 mA/F | 36.1 | 3.543 | 100 | 2.654 | 100 | 3624 | 100 | 0.275 | 0.317 | 100.0 |
| Prior art | | 100 mA/F | 361.8 | 2.948 | 100 | 2.390 | 100 | 3418 | 100 | | | |
| | | 250 mA/F | 904.5 | 2.286 | 78 | 2,049 | 86 | 3180 | 93 | | | |
| 2.7 V/3700 F | 2.1 | 10 mA/F | 37.0 | 3.783 | 110 | 2.792 | 105 | 3810 | 101 | 0.197 | 0.218 | 68.8 |
| Interconnecting | | 100 mA/F | 369.5 | 3.433 | 100 | 2.657 | 100 | 3791 | 100 | | | |
| member | | 250 mA/F | 923.7 | 2.933 | 85 | 2.458 | 92 | 3740 | 99 | | | |
| 2.7 V/3000 F | 3.2 | 10 mA/F | 31.3 | 3.091 | 119 | 2.248 | 111 | 3104 | 110 | 0.228 | 0.238 | 100.0 |
| Prior art | | 100 mA/F | 312,2 | 2.592 | 100 | 2.018 | 100 | 2830 | 100 | | | |
| | | 250 mA/F | 780.8 | 2.152 | 83 | 1.800 | 89 | 2650 | 94 | | | |

TABLE 1-continued

| Sample | Ver. | Reference Discharge Current | Discharge Current (A) | Energy (Wh) | % | Capacity (Ah) | % | Capacitance (F) | % | $ESR_{AC}$ | $ESR_{DC}$ | $ESR_{DC}$ rate (%) |
|---|---|---|---|---|---|---|---|---|---|---|---|---|
| 2.7 V/3000 F Interconnecting member | 3.3 | 10 mA/F | 30.4 | 3.094 | 112 | 2.234 | 106 | 3044 | 102 | 0.201 | 0.214 | 89.9 |
| | | 100 mA/F | 303.7 | 2.771 | 100 | 2.104 | 100 | 2977 | 100 | | | |
| | | 250 mA/F | 759.0 | 2.361 | 85 | 1.917 | 91 | 2821 | 95 | | | |

Moreover, a connection state in which the welding range is substantially extended is shown in FIG. 15, from which it can be seen that the efficiency of discharge characteristics required by the present invention can be achieved by connecting the terminals 24 and 28 to the interconnecting member 40.

As described above, the configuration of the present invention can improve the weldability of the terminal connection structure between the polarity-leads A and B of the electrode winding body 10, the interconnecting member 40, the terminals 24 and 28, and the terminal plate 20, in which the interconnecting member 40 has a donut-shaped strip or a fan-shaped strip, thus extending the boding range with the polarity-leads A and B as much as possible.

The effects obtained by the present invention with the above-described configuration are as follows:

1. Prevention of the can from being deformed or exploded by an increase in the internal pressure of the can;
2. Extension of the bonding range between the polarity-leads A and B of the electrode winding body 10 and the terminal plate 20;
3. Improvement of high-rate discharge (large current discharge) efficiency; and
4. Improvement of reduction rate of internal equivalent resistance.

In the case that polarity-leads of an aluminum electrode winding body (collector) having a thickness of 10 to 40 μm are directly welded to a terminal plate having a thickness of 0.5 to 1.0 mm, a high laser energy sufficient to basically melt the thick terminal plate 20 is used, and thus the polarity-leads are significantly affected by a minute change in the shape of the objects to be welded and by a change in contact state. As a result, the welding is not properly performed or the objects are excessively melted. The improper welding increases the internal resistance of a capacitor, and when the objects are excessively melted, the insulating paper may be burned to cause an insulation failure between the two electrodes. However, the present invention employs an interconnecting member 40 having an intermediate thickness to appropriately adjust the difference in thickness between the objects to be welded, thus removing the above-described failure factors and improving the high-rate discharge (large current discharge) efficiency.

INDUSTRIAL APPLICABILITY

As such, the discharge characteristics during high-rate discharge are improved, and thereby the discharge efficiency during large current discharge is improved.

According to the electrical energy storage device of the present invention, in which the porous membrane for closing the vent hole or the additional vent hole is expanded and burst in the accommodation hole of the can by the internal pressure of the can in the event that the internal pressure of the can is excessively increased by a long term use or an external factor, it is possible to prevent the can from being deformed or exploded. Moreover, in the event that the internal pressure of the electrode winding body is increased to a predetermined level, the internal gas is discharged from the electrode winding body to the outside such that the internal pressure is maintained at an appropriate pressure and the specific surface area between carbon layers is increased, thereby increasing the durability.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

The invention claimed is:

1. An electrical energy storage device comprising an electrode winding body, which includes a positive electrode generating electrons by oxidation and reduction, a negative electrode for absorbing the generated electrons, and separation layers for physically separating the negative electrode from the positive electrode, which are sequentially wound around a winding core, and an electrolyte provided between the positive electrode and the negative electrode, the electrical energy storage device comprising:
   a terminal plate for external connection connected to the electrode winding body;
   a cylindrical can for accommodating the electrode winding body connected to the terminal plate;
   a ring-shaped sealing member for closing a first opening formed in the can, wherein the sealing member comprises a first vent part having a first vent hole and integrally formed in the center of at least one side of the sealing member, and a second vent part having a second vent hole and integrally formed in the center of the other side of the sealing member; and
   the electrical energy storage device further comprising a conductive interconnecting member of electrically connecting the terminal plate and the electrical winding body and the interconnecting member comprises a second opening including two semicircular strips and opened to both sides, the second opening being formed on the same line as the first and second vent holes such that gas in the electrode winding body passes through the first and second vent holes.

2. The electrical energy storage device of claim 1, wherein the sides of the interconnecting member are roughly processed by etching or polishing using sandpaper or a grinder to increase the welding rate.

3. The electrical energy storage device of claim 1, further comprising a fluorine resin film as a porous membrane having continuous pores and interposed between the top of the first vent part and the second vent part and the bottom of an accommodation hole of the can to close the first vent hole and the second vent hole.

4. The electrical energy storage device of claim 1, further comprising a circular aluminum thin film as a porous membrane interposed between the top of the first vent part and the second vent part and the bottom of an accommodation hole of the can.

5. The electrical energy storage device of claim 1, further comprising a polymer (PTFE) thin film as a porous membrane having continuous pores and interposed between the top of the first vent part and the second vent part and the bottom of an accommodation hole of the can.

6. The electrical energy storage device of claim 3, wherein the porous membrane is adhered to the top of the first vent part or the second vent part using an adhesive.

7. The electrical energy storage device of claim 1, wherein the interconnecting member comprises a third opening including a U-shaped curved strip, the third opening being formed on the same line as the first vent hole such that the gas in the electrode winding body passes through the first vent hole.

8. The electrical energy storage device of claim 4, wherein the porous membrane is adhered to the top of the first vent part and the second vent part using an adhesive.

9. The electrical energy storage device of claim 5, wherein the porous membrane is adhered to the top of the first vent part and the second vent part using an adhesive.

* * * * *